(12) United States Patent  (10) Patent No.: US 9,279,400 B2
Doehring et al.  (45) Date of Patent: Mar. 8, 2016

(54) INJECTION DEVICE FOR INTRODUCING A UREA SOLUTION INTO THE EXHAUST TRACT OF AN INTERNAL COMBUSTION ENGINE

(75) Inventors: Jochen Doehring, Stuttgart-Stammheim (DE); Wolfgang Ripper, Stuttgart (DE); Juergen Hanneke, Stuttgart (DE); Godehard Nentwig, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 549 days.

(21) Appl. No.: 13/816,310

(22) PCT Filed: Jul. 19, 2011

(86) PCT No.: PCT/EP2011/062295
§ 371 (c)(1),
(2), (4) Date: Apr. 22, 2013

(87) PCT Pub. No.: WO2012/019879
PCT Pub. Date: Feb. 16, 2012

(65) Prior Publication Data
US 2013/0214057 A1  Aug. 22, 2013

(30) Foreign Application Priority Data
Aug. 9, 2010 (DE) .......................... 10 2010 039 051

(51) Int. Cl.
*F02M 47/02* (2006.01)
*F02M 7/02* (2006.01)
(Continued)

(52) U.S. Cl.
CPC .............. *F02M 47/025* (2013.01); *F01N 3/20* (2013.01); *F01N 3/206* (2013.01); *F01N 3/2066* (2013.01);
(Continued)

(58) Field of Classification Search
CPC ..... F02M 47/02; F02M 47/025; F02M 47/027
See application file for complete search history.

(56) References Cited

U.S. PATENT DOCUMENTS 7,621,258 B2* 11/2009 Heinz et al. ................... 123/467
2003/0025005 A1* 2/2003 Baranowski et al. ...... 239/533.2
(Continued)

FOREIGN PATENT DOCUMENTS

CN 101506518 8/2009
DE 10248433 4/2004
(Continued)

OTHER PUBLICATIONS
International Search Report for Application No. PCT/EP2011/062295 dated Sep. 2, 2011 (2 pages).

*Primary Examiner* — Ryan Reis
(74) *Attorney, Agent, or Firm* — Michael Best & Friedrich LLP

(57) ABSTRACT

The invention relates to an injection device (1), designed in particular for injecting fluid into an exhaust tract of an internal combustion engine, having a valve needle (14), an injection chamber (12) having at least one injection opening (44), and a control chamber (20). The injection device (1) is designed such that a pressure differential between the injection chamber (12) and the control chamber (20) brings about a displacement of the valve needle (14) between an open position in which a fluid flow through the injection opening (44) from the injection chamber (12) is released, and a closed position, in which the injection opening (44) is closed off. The injection chamber (22) and the control chamber (20) are hydraulically connected to an inlet (40, 42; 9), such that a pressure rise in the inlet (40, 42; 9) results in a pressure rise in the injection chamber (12), and a pressure rise in the control chamber (20) delayed in time relative to the pressure rise in the injection chamber (12), and said pressure differential brings about a displacement of the valve needle (14) from the closed position into an open position.

9 Claims, 2 Drawing Sheets

(51) Int. Cl.
*F01N 3/20* (2006.01)
*F01N 3/36* (2006.01)
*F02M 57/02* (2006.01)

(52) U.S. Cl.
CPC .. *F01N 3/36* (2013.01); *F02M 7/02* (2013.01); *F02M 57/027* (2013.01); *F01N 2610/1453* (2013.01); *F02M 47/027* (2013.01); *Y02T 10/24* (2013.01)

(56) References Cited

U.S. PATENT DOCUMENTS

| | | | |
|---|---|---|---|
| 2005/0224598 A1* | 10/2005 | Potz et al. | 239/88 |
| 2006/0208106 A1* | 9/2006 | Boehland et al. | 239/533.2 |
| 2007/0295003 A1 | 12/2007 | Dingle et al. | |
| 2008/0257980 A1* | 10/2008 | Magel | 239/89 |
| 2010/0263626 A1* | 10/2010 | Kammerstetter et al. | 123/337 |
| 2011/0168812 A1* | 7/2011 | Frasch et al. | 239/533.3 |

FOREIGN PATENT DOCUMENTS

| | | |
|---|---|---|
| EP | 1878920 | 1/2008 |
| JP | 2003519752 | 6/2003 |
| JP | 2004156544 | 6/2004 |
| JP | 2004521242 | 7/2004 |
| JP | 2006132538 | 5/2006 |
| WO | 2004033895 | 4/2004 |
| WO | 2006067015 | 6/2006 |
| WO | 2009051675 | 4/2009 |

* cited by examiner

INJECTION DEVICE FOR INTRODUCING A UREA SOLUTION INTO THE EXHAUST TRACT OF AN INTERNAL COMBUSTION ENGINE

BACKGROUND OF THE INVENTION

The demands placed on the exhaust-gas quality of internal combustion engines, in particular of internal combustion engines for driving motor vehicles, have steadily increased in recent years. In the case of diesel engines in particular, $NO_x$ emissions constitute a problem, which is counteracted by means of so-called SCR catalytic converters. In an SCR catalytic converter, environmentally harmful $NO_x$ is converted with the aid of $NH_3$, which is supplied to the catalytic converter generally in the form of an aqueous urea solution, into $N_2$ and $H_2O$.

To supply the urea solution to the exhaust gases of the internal combustion engine, a dosing system is required, which conventionally comprises an electrically operated pump and an electrically actuated dosing valve. Such dosing systems are cumbersome and expensive to produce, assemble and maintain.

EP 1 878 920 A1 discloses a liquid pump having an inlet, an outlet, a pump chamber for receiving the liquid, and an actuator which is movable between a first position and a second position and which is designed to pump liquid from the pump chamber into the outlet. The inlet and the outlet are fluidically connected to a supply passage when the actuator is in the first position. The supply passage runs around the actuator in order to permit a transfer of heat from the actuator to the liquid.

U.S. 2007/0295003 A1 describes a high-pressure dosing pump which is designed to provide a reducing agent to an exhaust-gas reduction system. The high-pressure dosing pump has an electromagnet for driving a piston which is arranged in a movable manner in an inner bore of a valve housing of the pump. The inner bore has a pressure chamber with an inlet one-way valve and with an outlet one-way valve. Movement of the piston causes reducing agent to be supplied at high pressure to an injection nozzle. The injection nozzle is arranged at a location which permits a maximum reduction of undesired pollutants in the exhaust gases.

SUMMARY OF THE INVENTION

It is an object of the invention to provide an improved dosing system which permits an effective injection of fluid and which is inexpensive to produce, assemble and maintain.

An injection device according to the invention, which is designed in particular for injecting fluid into an exhaust tract of an internal combustion engine, has a valve needle, an injection chamber with at least one injection orifice, and a control chamber. The injection device is designed such that a pressure difference between the injection chamber and the control chamber causes a movement of the valve needle between an open position, in which the valve needle permits a flow of fluid out of the injection chamber through the injection orifice, and a closed position, in which the valve needle closes the injection orifice. The injection chamber and the control chamber are hydraulically connected to a fluid inlet in such a way that a pressure increase in the fluid inlet results in a pressure increase in the injection chamber and, after a time delay in relation to the pressure increase in the injection chamber, a pressure increase in the control chamber. In this way, a pressure difference is temporarily generated between the injection chamber and the control chamber, which pressure difference results in a movement of the valve needle from the closed position into an open position.

An injection device of said type is of simple and inexpensive construction and operates reliably. Since the opening and closing of the nozzle needle is realized hydraulically by means of a pressure difference between the injection chamber and the control chamber, an injection device of said type makes do without active actuators which act directly on the nozzle needle and which, owing to the high injection pressures, are complex, expensive and susceptible to failure.

In one embodiment, the control chamber is hydraulically connected via a control chamber inlet throttle to the inlet. By means of such an inlet throttle, the fluid inflow into the control chamber can be regulated. In particular, it is possible for the pressure increase in the control chamber to be delayed by means of a throttled fluid inlet, and for the opening and closing behavior of the nozzle needle to be adjusted through the dimensioning of the control chamber inlet throttle.

In one embodiment, the control chamber is hydraulically connected via a control chamber outlet throttle to an outlet through which fluid can be discharged from the control chamber. By means of such an outlet throttle, the fluid outflow out of the control chamber can be regulated in a targeted manner. In particular, the opening and closing behavior of the nozzle needle can be adjusted through the dimensioning of the control chamber outlet throttle.

In one embodiment, an injection chamber outlet duct (bypass duct) having an injection chamber outlet throttle (bypass throttle) is provided and fluid can be discharged from the injection chamber through the injection chamber outlet duct and the injection chamber outlet throttle. By means of an injection chamber outlet duct of said type, the fluid pressure in the injection chamber below the nozzle needle can be quickly depleted, such that high closing speeds can be realized.

In one embodiment, the inlet is hydraulically connected via a one-way valve to a pressure chamber. The pressure chamber is designed for increasing the pressure of the fluid. The one-way valve prevents a return flow of fluid from the pressure chamber into the inlet. Such a return flow would impair or even prevent an increase of the pressure in the pressure chamber.

In one embodiment, the volume of the pressure chamber can be varied by movement of a pressure element. The injection pressure can thus be increased beyond the pressure of the fluid in the fluid supply. In particular, the fluid need not be supplied to the injection device at a high (injection) pressure, and it is possible to dispense with an external high-pressure pump and complex, expensive high-pressure lines which are susceptible to failure.

In one embodiment, the injection chamber outlet duct is hydraulically connected to the pressure chamber. Fluid from the injection chamber can thus be discharged from the injection chamber into the pressure chamber through the injection chamber outlet duct, in particular when the volume of the pressure chamber is increased during a suction process, in order to increase the speed of the closing process.

In one embodiment, a one-way valve is provided in the injection chamber outlet duct. The one-way valve prevents a fluid flow from the pressure chamber into the injection chamber through the injection chamber outlet duct. Such a fluid flow could uncontrollably influence the opening and closing behavior of the nozzle needle.

In one embodiment, the pressure element is designed as a diaphragm which delimits the pressure chamber. A diaphragm provides a proven and easily actuable pressure element. The diaphragm may be produced from a material which comprises plastic and/or metal. A diaphragm produced from plastic has a low mass and can be moved quickly with low force. A diaphragm which comprises metal is particularly resistant to high pressures and temperatures of the fluid in the injection device.

In one embodiment, the injection chamber outlet duct is hydraulically connected to the outlet. Such an injection chamber outlet duct which is connected to an outlet makes it possible for fluid to be discharged from the injection chamber particularly effectively and quickly.

In one embodiment, an actuable switching valve is formed in the injection chamber outlet duct. By means of an actuable switching valve in the injection chamber outlet duct, the injection chamber outlet duct can be opened and closed in a targeted manner. This permits an effective and simple actuation of the nozzle needle by opening and closing of the switching valve.

In one embodiment, the control chamber is also hydraulically connected via the controllable switching valve to the outlet. This permits an even more effective actuation of the nozzle needle by opening and closing of the switching valve.

BRIEF DESCRIPTION OF THE DRAWINGS

The invention will be explained in more detail below on the basis of the appended figures.

DETAILED DESCRIPTION

In the following description of the figures, expressions such as "top" and "bottom" serve for improved explanation of the schematic illustrations of an exemplary embodiment of the invention shown in the respective figure, without restricting the invention to the exemplary embodiment shown or to a certain orientation or installation position.

Figure 1:
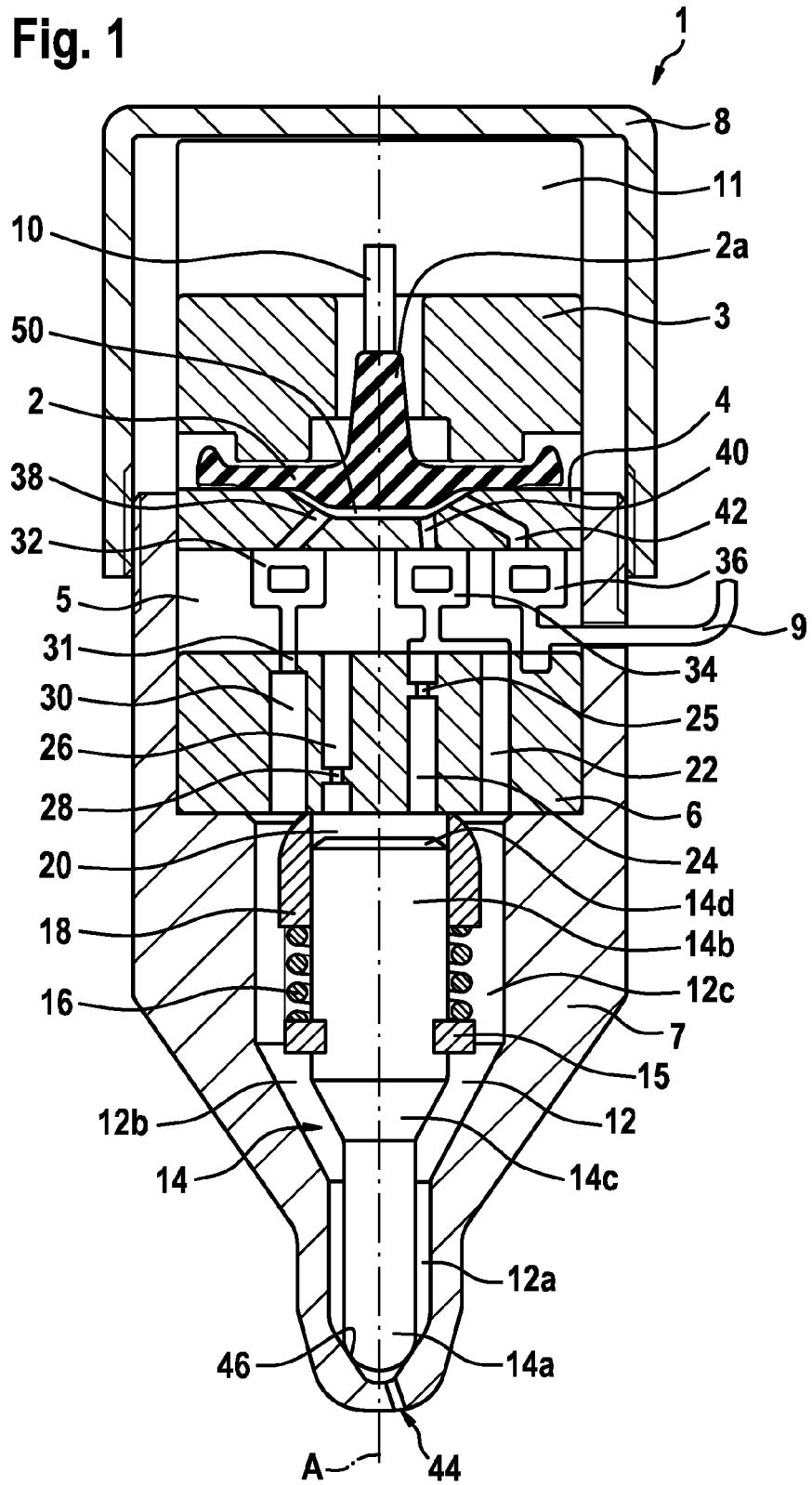
FIG. 1 shows a sectional view of a first exemplary embodiment of an injection device according to the invention.

FIG. 1 shows a sectional view of a first exemplary embodiment of an injection device 1 according to the invention.

An injection device 1 according to the invention has a nozzle body 7 which is for example of cylindrical form about a longitudinal axis A and along the longitudinal axis A of which is formed an injection chamber 12. The injection chamber 12 has a first cylindrical region 12a illustrated at the bottom in FIG. 1 and has a second cylindrical region 12c arranged thereabove.

In a plane which is oriented at right angles to the longitudinal axis A, the first cylindrical region 12a has a smaller cross section than the second cylindrical region 12c. Between the first and the second cylindrical region 12a, 12c there is formed a frustoconical region 12b, the cross section of which widens along the longitudinal axis A from the cross section of the first cylindrical region 12a to the cross section of the second cylindrical region 12c.

At the face end, illustrated at the bottom in FIG. 1, of the first cylindrical region 12a of the injection chamber 12, there is formed an injection orifice 44 through which fluid emerges from the injection chamber 12 during an injection process.

In the injection chamber 12 there is arranged a nozzle needle 14 which is of substantially cylindrical form and the longitudinal axis of which is oriented along the longitudinal axis A of the nozzle body 7. The nozzle needle 14 is formed with a lower cylindrical region 14a and an upper cylindrical region 14b, wherein, in a plane arranged at right angles to the longitudinal axis A of the nozzle needle 14, the upper cylindrical region 14b of the nozzle needle 14 has a larger cross section than the lower cylindrical region 14a. Between the lower cylindrical region 14a and the upper cylindrical region 14b there is formed a frustoconical transition region 14c, the cross section of which increases in size in its profile parallel to the longitudinal axis A from the cross section of the lower cylindrical region 14a to the cross section of the upper cylindrical region 14b of the nozzle needle 14.

The nozzle needle 14 is movable along the longitudinal axis A between a lower, closed position and an upper, open position. When the nozzle needle 14 is situated in the lower, closed position, the lower cylindrical region 14a of the nozzle needle 14 rests on a valve seat 46 formed above the injection orifice 44 on the nozzle body 7 and closes the valve seat 46 in a substantially fluid-tight manner, such that no fluid can escape from the injection chamber 12 through the injection orifice 44.

An upper end 14d of the nozzle needle 14 is surrounded by a cylindrical control chamber sleeve 18. Within the control chamber sleeve 18, there is formed above the upper end 14d of the nozzle needle 14 a control chamber 20, the volume of which can be varied by movement of the nozzle needle 14 along the longitudinal axis A. Conversely, the nozzle needle 14 can be moved by variation of the pressure difference between the control chamber 20 and the injection chamber 12.

On the circumference of the upper cylindrical region 14b of the nozzle needle 14, a support ring 15 is formed below the control chamber sleeve 18. Between the support ring 15 and the control chamber sleeve 18 there is arranged around the circumference of the nozzle needle 14 a cylindrical nozzle needle spring element 16 which is supported with its face sides against the control chamber sleeve 18 at one side and against the support ring 15 on the other side and which presses the nozzle needle 14 elastically in the direction of the lower, closed position.

On its upper side which faces away from the nozzle needle 14, the control chamber 20 is delimited by a throttle plate 6. Within the throttle plate 6 there are formed a number of fluid ducts 22, 24, 26, 30.

Above the throttle plate 6 there is arranged a valve plate 5. In the valve plate 5 there are formed three one-way valves 32, 34, 36, wherein each of the one-way valves 32, 34, 36 is hydraulically connected to at least one of the fluid ducts 22, 24, 26, 30 formed in the throttle plate 6. The one-way valves 32, 34, 36 may be formed for example as check valves.

Above the valve plate 5 there is arranged a control plate 4 in which a pressure chamber 50 and three fluid ducts 36, 40 and 42 are formed. Each of the three fluid ducts 36, 40 and 42 connects the pressure chamber 50 hydraulically to in each case one of the one-way valves 32, 34, 36 formed in the valve plate 5.

In particular, the pressure chamber 50 is hydraulically connected via an inlet duct 42 and an inlet valve 36 to a fluid inlet 9 through which fluid can be supplied to the injection device 1 from an external fluid source. The inlet valve 36 is formed as a one-way valve such that it permits a fluid flow from the fluid inlet 9 into the pressure chamber 50 and prevents a return flow of fluid from the pressure chamber 50 into the fluid inlet 9.

The pressure chamber 50 is hydraulically connected to the control chamber 20 via a pressure duct 40 formed in the valve plate 4, via a pressure valve 34 formed in the valve plate 5, and via a control chamber duct 24 which is formed in the throttle plate 6 and in which a control chamber throttle 25 is provided. Furthermore, an injection chamber duct 22 which is formed in the throttle plate 4 hydraulically connects the pressure valve 34 to the injection chamber 12. The pressure valve 34 is formed as a one-way valve such that it permits a fluid flow from the pressure chamber 50 into the control chamber 20 and into the injection chamber 12 and prevents a fluid flow from the control chamber 20 and/or from the injection chamber 12 into the pressure chamber 50.

The injection chamber 12 is additionally hydraulically connected to the pressure chamber 50 by an injection chamber outlet duct (bypass duct) 30, which is formed in the throttle plate 6 and which has an injection chamber outlet throttle (bypass throttle) 31, and by an injection chamber outlet valve (bypass valve) 32 formed in the valve plate 5. The injection chamber outlet valve 32 is formed as a one-way valve such that it permits a fluid flow from the injection chamber 12 into the pressure chamber 50 and prevents a fluid flow in the opposite direction, that is to say from the pressure chamber 50 into the injection chamber 12.

A side, which faces away from the control plate 4, of the pressure chamber 50 is delimited by an elastic diaphragm 2. The elastic diaphragm 2 is arranged above the valve plate 5 so as to span a plane arranged substantially at right angles to the longitudinal axis A. A central region 2a of the diaphragm 2, which is formed around the longitudinal axis A, is connected to an armature 10 arranged on that side of the diaphragm 2 which faces away from the control plate 4.

Around an upper region, which faces away from the diaphragm 2, of the armature 10 there is arranged an electromagnet 11 which is spaced apart from the elastic diaphragm 2 in a direction parallel to the longitudinal axis A by a spacer 3. The armature 10 can be moved in a direction parallel to the longitudinal axis A by activation or deactivation of the electromagnet 11. By means of such a movement of the armature 10, the elastic diaphragm 2 is moved such that the volume of the pressure chamber 50 is varied.

The electromagnet 11, the spacer 3, the armature 10 and the diaphragm 2 are surrounded, in the circumferential direction and on the side facing away from the nozzle needle 4, by a cup-shaped nozzle clamping nut 8 which is open in the downward direction. The nozzle body 7 is inserted into the open side of the nozzle clamping nut 8 and screwed together with the nozzle clamping nut 8 in such a way that the injection device 1 is closed in a fluid-tight manner.

For the suction of fluid into the pressure chamber 50, the electromagnet 11 is deactivated. The elastic diaphragm 2, which is deformed when the electromagnet 11 is activated, moves into its starting and suction position owing to its inherent elasticity. Fluid from a fluid inlet 9 which is hydraulically connected to the inlet valve 36 formed in the valve plate 5 flows into the pressure chamber 50 through the inlet valve 36, which opens for a fluid flow in this direction, and through an inlet duct 42 formed in the control plate 4.

As long as the pressure in the pressure chamber 50 is not higher than the pressure in the injection chamber 12 or in the control chamber 20, the injection chamber outlet valve 32 and the pressure valve 34 are closed. The injection chamber outlet valve 32 and the pressure valve 34 thereby prevent fluid from flowing out of the injection chamber 12 and/or out of the control chamber 20 into the pressure chamber 50.

To initiate an injection process, the electromagnet 11 is activated (energized) such that the magnetic force generated by the electromagnet 11 moves the armature 10, and with it the central region 2a of the elastic diaphragm 2, "downward" in the direction of the control plate 4. The elastic diaphragm 2 reduces the volume of the pressure chamber 50, and the pressure in the pressure chamber 50 increases.

As a result of the increased pressure in the pressure chamber 50, the pressure valve 34 opens and fluid flows from the pressure chamber 50 into the injection chamber 12 through the open pressure valve 34 and through an inlet duct 22 formed in the throttle plate 6.

At the same time, fluid flows from the pressure chamber 50 into the control chamber 20 through the open pressure valve 34 and through a control chamber duct 24 formed in the throttle plate 6.

In the control chamber duct 24 there is formed a control chamber throttle 25, whereby the fluid flow from the pressure chamber 50 into the control chamber 20 is throttled, and the pressure increase caused in the control chamber 20 by the fluid flow is delayed in terms of time in relation to the pressure increase in the injection chamber 12 caused by said fluid flow from the pressure chamber 50 into the injection chamber 12.

As a result of the fluid pressure which increases more quickly in the injection chamber 12 than in the control chamber 20, an upwardly directed force is exerted on the nozzle needle 14, which force moves the nozzle needle 14 from the closed position into an open position counter to the force of the nozzle needle spring 16 and counter to the pressure in the control chamber 20, which has not increased to as great an extent owing to the control chamber throttle 25. The lower region 14a of the nozzle needle 14 lifts from the valve seat 46 and fluid escapes from the injection chamber 12 through the injection orifice 44 (injection process).

Fluid which is displaced out of the control chamber 20 by the opening movement of the nozzle needle 14 escapes from the control chamber 20 through an outlet duct 26, which is formed in the throttle plate 6 and in which is provided an outlet throttle 28, and through an outlet not visible in FIG. 1.

Fluid at elevated pressure flows out of the injection chamber 12 through the open injection orifice 44 until, owing to the fluid escaping from the injection chamber 12, the fluid pressure in the injection chamber 12 has fallen to such an extent that it is no longer sufficient to hold the nozzle needle 14 in an open position counter to the combination of the fluid pressure in the control chamber 20 and the force of the nozzle needle spring element 16. The nozzle needle 14 is pushed by the fluid pressure in the control chamber 20 and by the force of the nozzle needle spring element 16 into the lower closed position again, in which the lower region 14a of the nozzle needle 14 rests on the valve seat 46 and closes the injection orifice 44.

The electromagnet 11 is deactivated and the diaphragm 2 moves into its starting and suction position again. The volume of the pressure chamber 50 is increased and the pressure in the pressure chamber 50 reduced, such that, by means of an additional fluid flow from the injection chamber 12 through the injection chamber outlet duct 30 into the pressure chamber 50, the pressure in the injection chamber 12 can be depleted more quickly in order to increase the speed of the closing process of the nozzle needle 14.

The injection chamber outlet duct 30, the injection chamber outlet throttle 31 and the injection chamber outlet valve 32 are optional for accelerating the closing process. The opening and closing behavior of the nozzle needle 14 and in particular the opening and closing speed can be adjusted in a targeted manner through the dimensioning of the control chamber throttle 25, the outlet throttle 28 and if appropriate the injection chamber outlet throttle 31.

Figure 2:
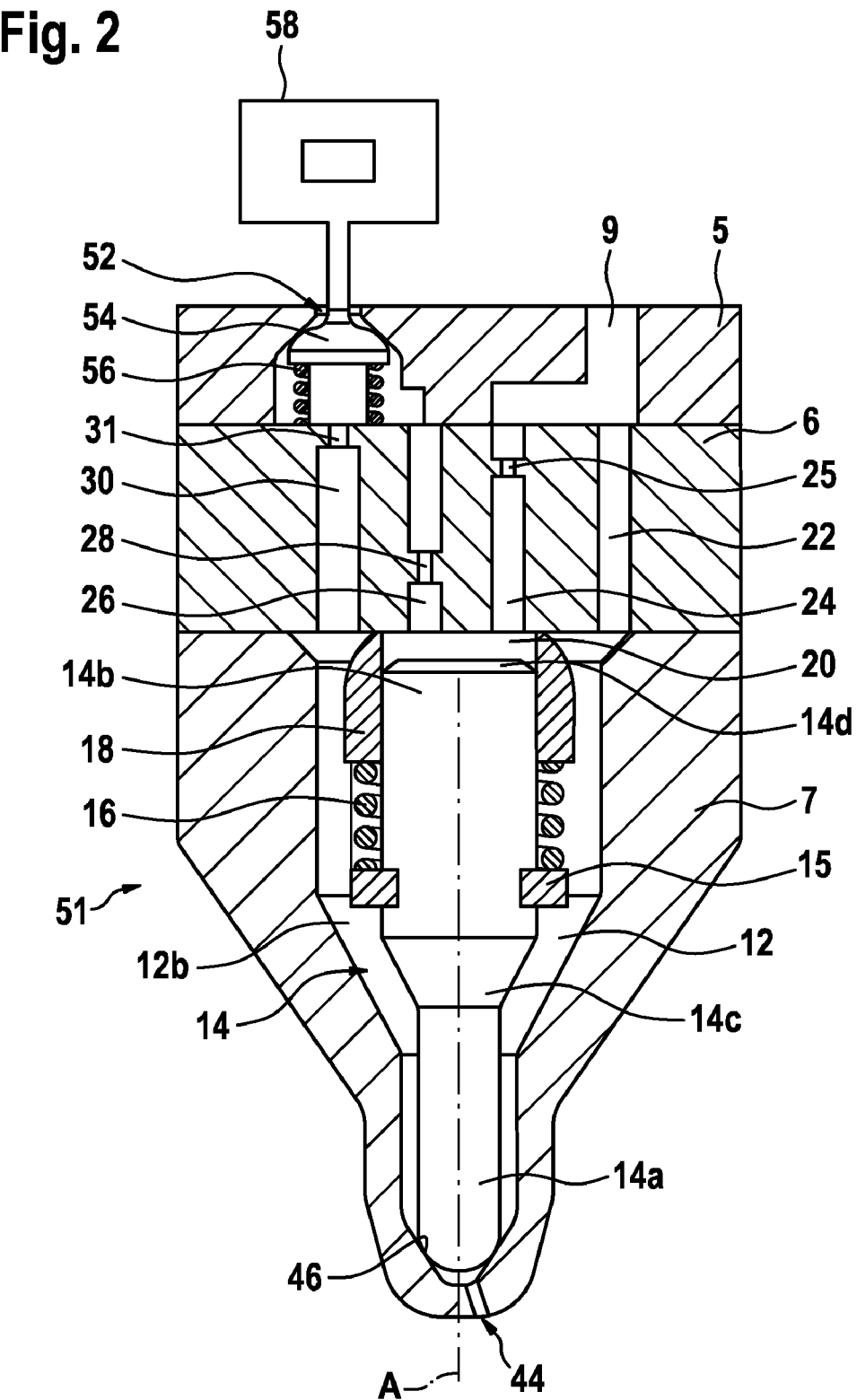
FIG. 2 shows a sectional view of a second exemplary embodiment of an injection device according to the invention.

FIG. 2 shows a second exemplary embodiment of an injection device 51 according to the invention.

The nozzle body 7 with the injection chamber 12 and with the nozzle needle 14 and also the throttle plate 6 of the second exemplary embodiment are of exactly the same design as in the first exemplary embodiment shown in FIG. 1, and therefore will not be described again in detail.

The pressure-generating part of the injection device 51, which generates the desired injection pressure, of the second exemplary embodiment is not shown in the detail shown in FIG. 2.

To initiate an injection process, fluid at injection pressure is conducted into the inlet 9 which is formed in the valve plate 5 and in which, in this exemplary embodiment, no one-way valve is provided. As in the first exemplary embodiment, the fluid flows into the injection chamber 12 through the inlet duct 22 formed in the throttle plate 6, and into the control chamber 20 through the control chamber duct 24 and the control chamber throttle 25.

The control chamber 20 is connected via a control chamber outlet duct 26, in which a control chamber outlet throttle 28 is provided, to a valve chamber of a switching valve 52 formed in the valve plate 5. The injection chamber 12 is hydraulically connected via an injection chamber outlet duct 30, in which an injection chamber outlet throttle 31 is formed, to the valve chamber of the switching valve 52. The switching valve 52 issues at the outflow side into an outlet (not shown) which is designed to discharge fluid from the injection device 51.

The switching valve 52 has a movable closing body 54 which, in the rest state, is pushed into an upper, closed position, in which it prevents a fluid flow from the valve chamber into the outlet, by a switching valve spring element 56 which surrounds the closing body 54.

By contrast to the valves 32, 34, 36 of the first exemplary embodiment, the switching valve 52 is not a passive one-way valve controlled by the fluid flow or by a difference in fluid pressure. Instead, the closure body 54 of the switching valve 52 is mechanically connected to an actuator 58 which is arranged above the valve plate 5 and which is designed for example as an electromagnetic or piezo actuator. By activation of the actuator 58, the closure body 54 can be moved counter to the force of the switching valve spring element 56 into an open position in which it permits a fluid flow through the switching valve 52. When the switching valve 52 is open, fluid can flow out of the control chamber 20 through the outlet duct 26 and the outlet throttle 28, and out of the injection chamber 12 through the injection chamber outlet duct 30 and the injection chamber outlet throttle 31, into the outlet (not shown in FIG. 2) arranged downstream of the switching valve 52.

To initiate an injection process, fluid at injection pressure is supplied to the inlet 25 of the injection device 51 when the switching valve 52 is closed. As in the first exemplary embodiment, the control chamber throttle 25 formed in the control chamber duct 24 has the effect that the supplied fluid flows more quickly into the injection chamber 12 than into the control chamber 20, and the pressure increases more quickly in the injection chamber 12 than in the control chamber 20. When the pressure difference between the injection chamber 12 and the control chamber 20 exceeds a predefined critical value, the nozzle needle 14 moves from the closed position into an open position and opens up the injection orifice 44, such that fluid flows out of the injection chamber 12 through the injection orifice 44 (injection process).

To end the injection process, the actuator 58 is actuated such that it opens the switching valve 52 and fluid flows out of the injection chamber 12 through the injection chamber outlet duct 30 and the injection chamber outlet throttle 31 and out of the control chamber 20 through the control chamber outlet duct 26 and the control chamber outlet throttle 28. The injection chamber outlet throttle 31 and the control chamber outlet throttle 28 are dimensioned here such that the pressure falls more quickly in the injection chamber 12 than in the control chamber 20. The pressure in the control chamber 20 is thus temporarily higher than the pressure in the injection chamber 12. As a result of said pressure difference between the control chamber 20 and the injection chamber 12, the nozzle needle 14 is pushed, in interaction with the nozzle needle spring element 16, into the closed position in which the nozzle needle 14 closes the injection orifice 44, and the injection process is ended.

The components of an injection device 1, 51 according to the invention, and in particular the diaphragm 2 and the valves 32, 34, 36, 52, can be produced inexpensively and in a weight-saving manner from plastic. In the case of elevated demands being placed on pressure resistance and temperature resistance, metal parts may also be used. In particular, as valves, use may be made of metal valves such as are known from common rail fuel injectors.

The invention claimed is:

1. An injection device (1; 51) comprising
a valve needle (14),
an injection chamber (12) with at least one injection orifice (44), and
a control chamber (20),
wherein the injection device (1; 51) is configured such that a pressure difference between the injection chamber (12) and the control chamber (20) causes a movement of the valve needle (14) between an open position, in which the valve needle (14) permits a fluid flow through the injection orifice (44), and a closed position, in which the valve needle (14) closes the injection orifice (44),
wherein the injection chamber (12) and the control chamber (20) are hydraulically connected to an inlet (40, 42; 9) in such a way that a pressure increase in the inlet (40, 42; 9) results in a pressure increase in the injection chamber (12) and, after a time delay in relation to the pressure increase in the injection chamber (12), a pressure increase in the control chamber (20), wherein an injection chamber outlet duct (30) having an injection chamber outlet throttle (31) is provided and fluid can be discharged from the injection chamber (12) through the injection chamber outlet duct (30), wherein the inlet is hydraulically connected via one-way inlet valve (34) to a pressure chamber (50), and wherein the pressure chamber (50) is formed with a device for increasing the pressure of fluid in the pressure chamber (50).

2. The injection device (1; 51) as claimed in claim 1, wherein the control chamber (20) is hydraulically connected via a control chamber inlet throttle (25) to the inlet (40, 42; 9).

3. The injection device (1; 51) as claimed in claim 1, wherein the control chamber (20) is hydraulically connected via a control chamber outlet throttle (28) to an outlet through which fluid can be discharged from the control chamber (20).

4. The injection device (1) as claimed in claim 1, wherein the injection chamber outlet duct (30) is hydraulically connected to the pressure chamber (50).

5. The injection device (1) as claimed in claim 4, wherein in the injection chamber outlet duct (30) there is provided an injection chamber outlet valve (32).

6. The injection device (1) as claimed in claim 1, wherein the volume of the pressure chamber (50) can be varied by movement of a pressure element (2).

7. The injection device (51) as claimed in claim 3, wherein the injection chamber outlet duct (30) is hydraulically connected to the outlet via a controllable switching valve (52).

8. The injection device (51) as claimed in claim 7, wherein the control chamber (20) is hydraulically connected via the controllable switching valve (52) to the outlet.

9. The injection device (1) as claimed in claim 4, wherein in the injection chamber outlet duct (30) there is provided an injection chamber outlet valve (32) which is a one-way valve.

\* \* \* \* \*